(12) United States Patent
Khan

(10) Patent No.: US 10,731,270 B2
(45) Date of Patent: Aug. 4, 2020

(54) METHOD OF REMOVING PARTICLES FROM AN ELECTRONIC COMPONENT

(71) Applicant: Seagate Technology LLC, Cupertino, CA (US)

(72) Inventor: Zubair Ahmed Khan, Villa Park, IL (US)

(73) Assignee: Seagate Technology LLC, Fremont, CA (US)

(*) Notice: Subject to any disclaimer, the term of this patent is extended or adjusted under 35 U.S.C. 154(b) by 344 days.

(21) Appl. No.: 15/686,021

(22) Filed: Aug. 24, 2017

(65) Prior Publication Data
US 2019/0062940 A1 Feb. 28, 2019

(51) Int. Cl.
*C25F 1/00* (2006.01)
*C25F 1/02* (2006.01)
*G11B 5/48* (2006.01)
*G11B 5/31* (2006.01)

(52) U.S. Cl.
CPC .............. *C25F 1/00* (2013.01); *G11B 5/4826* (2013.01); *G11B 5/3169* (2013.01)

(58) Field of Classification Search
CPC ............. C25F 1/00–10; B29C 71/0081; B29C 71/0009; B08B 3/10
See application file for complete search history.

(56) References Cited

U.S. PATENT DOCUMENTS

| | | | | |
|---|---|---|---|---|
| 3,457,151 A | * | 7/1969 | Kortejarvi | C25F 1/00 205/722 |
| 4,319,013 A | | 3/1982 | Cabestany et al. | |
| 6,203,691 B1 | * | 3/2001 | Hoffman, Jr. | C25F 1/00 204/224 R |
| 6,558,527 B2 | | 5/2003 | Enomoto et al. | |
| 9,056,382 B2 | | 6/2015 | Litke et al. | |
| 9,190,108 B2 | | 11/2015 | Engelkes et al. | |
| 9,230,608 B2 | | 1/2016 | Ellison et al. | |
| 9,613,658 B2 | | 4/2017 | Engelkes et al. | |
| 2003/0116173 A1 | * | 6/2003 | Humenik | C11D 7/06 134/1 |
| 2004/0256237 A1 | * | 12/2004 | Kobata | B23H 5/08 205/117 |
| 2005/0159087 A1 | | 7/2005 | Bartz | |
| 2005/0167284 A1 | * | 8/2005 | Giri | C25F 1/00 205/703 |

(Continued)

FOREIGN PATENT DOCUMENTS

| | | | | |
|---|---|---|---|---|
| DE | 102009013467 A1 | * | 9/2010 | ............. C25D 17/16 |
| JP | 04354899 A | * | 12/1992 | |

OTHER PUBLICATIONS

Takenori Notoya and George W. Poling. Benzotriazole and Tolyltriazole as Corrosion Inhibitors for Copper and Brasses. vol. 30, No. 7. (Year: 1981).*

(Continued)

*Primary Examiner* — Steven A. Friday
(74) *Attorney, Agent, or Firm* — Kagan Binder, PLLC

(57) ABSTRACT

Particles are removed from electronic components, such as components of data storage devices by use of an electrochemical process. An electronic component is immersed in an electrochemical bath, and a voltage is applied across the +ve electrode and −ve electrode in an amount sufficient to remove charged particles present on a surface of the electronic component.

20 Claims, 10 Drawing Sheets

(56) References Cited

U.S. PATENT DOCUMENTS

| | | | | |
|---|---|---|---|---|
| 2005/0209117 A1* | 9/2005 | Friedrich | ........... | C08G 73/0233 |
| | | | | 510/175 |
| 2008/0287041 A1* | 11/2008 | Kordic | .................... | B23H 5/08 |
| | | | | 451/72 |
| 2013/0256146 A1* | 10/2013 | Chua | ........................ | C25F 1/00 |
| | | | | 205/261 |
| 2015/0144502 A1* | 5/2015 | Keswani | ................... | C25F 1/00 |
| | | | | 205/687 |
| 2018/0245234 A1* | 8/2018 | Hoffman, Jr. | ............. | B22C 1/22 |

OTHER PUBLICATIONS

M. E. Baumgaertner. Assessment of surface cleanliness for metal surfaces using electrochemical methods. Thesis<https://hdl.handle.net/2134/12502> (Year: 1994).*

"Review—Understanding and Controlling Electrochemical Effects in Wet Processing" S. Raghavan et al., ECS Journal of Solid State Science and Technology, 5 (6) P309-P314 (2016); http://jss.ecscli.org/content/5/6/P309.full.

* cited by examiner

METHOD OF REMOVING PARTICLES FROM AN ELECTRONIC COMPONENT

BACKGROUND

The present disclosure relates to removal of particles from electronic components. Electronic components, and in particular data storage devices and most particularly hard disk drive components, are sensitive to particulate contamination. For example, in the case of disk drives, particulate contaminants can lead to head and media scratches, can cause read/write errors or degraded performance of the read or write operation of the head (e.g., skip-writes, modulated writers, weak writes, clearance stability and settling, and incorrect clearance setting), and can lead to interface failure and head crashes. As the drive heads become smaller and areal densities increase, disc drives are more susceptible to these contaminants.

Most current disc drives include a filter to remove particles (i.e., a particle filter) and a filter to remove gaseous contaminants (i.e., a chemical filter).

SUMMARY

Particles are ubiquitous in preparation of electronic devices, and can be come from any of a number of sources during manufacture of electronic components. Such particles may be generated during a machining step, or may simply be present in the production environment. It is very advantageous to remove these particles at some stage of the component manufacturing process. In an embodiment, particles are removed from the component at a late stage of the component manufacturing process, e.g. just before assembly into the final electronic device. It has been found that by immersing an electronic component in an electrochemical bath, any charged particles present on the component can be removed by applying a voltage across the +ve and −ve electrodes in an amount sufficient to remove charged particles present on a surface of the electronic component.

Embodiments of the present disclosure include a method of removing particles from an electronic component, the method comprising the steps of:

Providing an electrochemical bath comprising a +ve electrode, a −ve electrode and an electrolyte solution;

Disposing an electronic component in the electrochemical bath; and

Applying a voltage across the +ve electrode and −ve electrodes in an amount sufficient to remove charged particles from a surface of the electronic component.

The present method effectively removes particles from electronic components with a reduced or eliminated need to resort to using aggressive cleaning techniques that can be damage delicate components.

DETAILED DESCRIPTION

The electronic component from which particles are to be removed may be any component that would benefit in operation by such removal. Examples of such electronic components include circuit boards, circuits, and components of digital storage media. In an embodiment, electronic components include components of magnetic media and optical data storage media. In an embodiment, electronic components include components of a hard disc drive system, including a recording head of hard disc drive. In an embodiment, electronic components include housings or other assembly components that are in close proximity to functional electronics. Such housings or other assembly components in embodiment are treated because they may act as a source of particles before or during operation of the electronic component.

In a preferred embodiment, the electronic component is a data storage component. Examples of data storage components include components of hard disk drive systems (HDDs). HDDs include one or more magnetic data storage disks. A transducing head carried by a slider assembly near the disk, while the disk spins, is used to read from or write to data tracks on the magnetic disk. The slider assembly includes a transducing read head, a transducing write head, or both, along with a "slider element" that includes a surface that faces the spinning disk and acts as an "air bearing" relative to the spinning disk. Any or all of these components in particular benefit from the present particle removal process.

Unwanted contaminants can adversely affect fly height behavior of the slider, such as leading to elevated or decreased fly height, fly asymmetry in roll or pitch character, excessive modulation, and head-disc crashing or contact by contaminant build up and accumulation on the slider and/or "bridging" mechanisms between the head and disc. All of these mechanisms result in degraded performance of the read and/or write operation of the head (e.g. skip-writes, modulated writers, weak writes, clearance stability and settling, and incorrect clearance setting).

The particles to be removed may be from any source, provided that they exhibit a charge under conditions of exposure to a potential in an electrochemical bath. In an embodiment, the particles to be removed comprise talc. Talc is hydrated magnesium silicate having the formula $Mg_3Si_4O_{10}(OH)_2$ or $3MgO.4SiO_2.H_2O$. Talc can take on a negative net charge in certain electrolytes.

Figure 1:
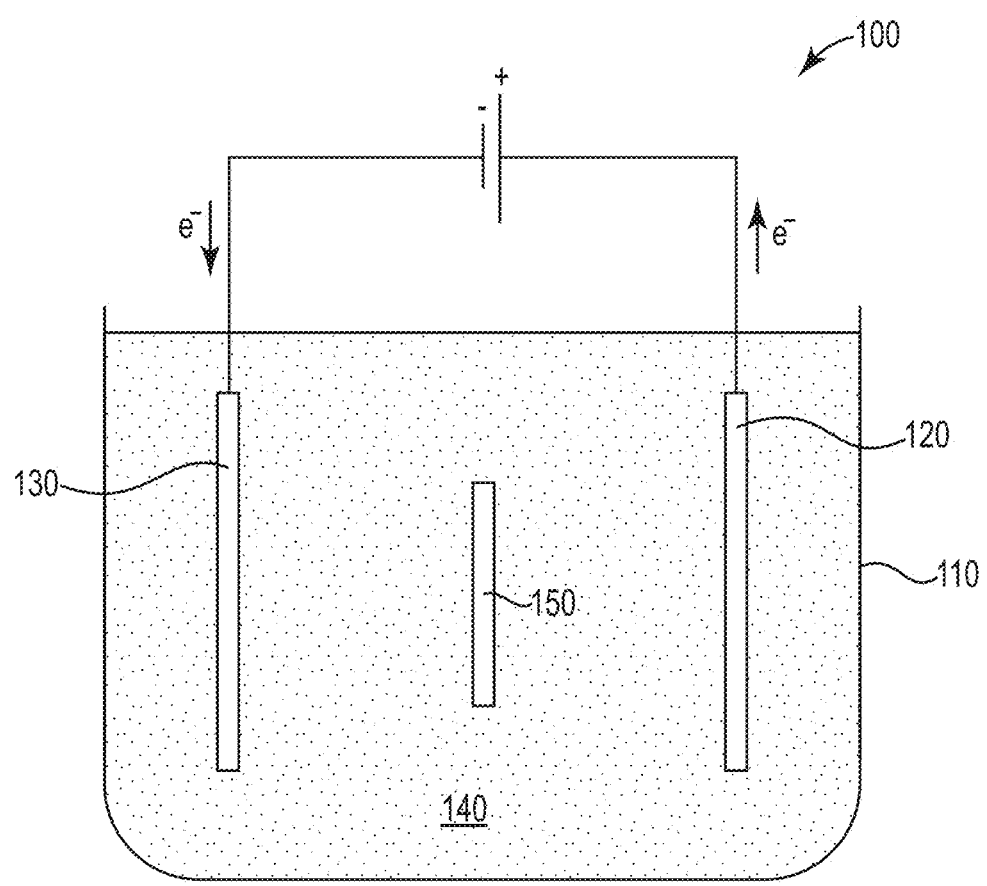
FIG. 1 is a schematic elevation view of an embodiment of an electrochemical bath that may be used to carry out the present method.

The electronic component is placed in an electrochemical bath in the present process. A schematic elevation view of an embodiment of an electrochemical bath that may be used to carry out the present method is shown in FIG. 1. The electrochemical bath 100 comprises a container 110 having an electrolyte solution 140 disposed therein, and at least one +ve electrode 120 and at least one –ve electrode 130 in contact with the electrochemical solution and positioned in a spaced relationship, so that an electronic component 150 can be placed between the at least one +ve electrode and at least one –ve electrode.

The electrolyte solution comprises an electrolyte, which is a substance that produces an electrically conducting solution when dissolved in a polar solvent, such as water. In a preferred embodiment, the electrolyte is selected such that it does not harm the electronic component to be treated or the electrodes. In a preferred embodiment, the electrolyte is selected such that it is non-corrosive. In a preferred embodiment, the electrolyte is selected such that it is a corrosion inhibitor.

Examples of electrolytes include salts of acids, such as boric acid, citric acid, phosphoric acid, and sulfonic acid. In an embodiment, the counter-ion of the salt comprises barium, magnesium, potassium, or sodium salts. Specific embodiments of electrolytes include borates and citrates. In an embodiment, the electrolyte solution comprises an amphoteric electrolyte. Examples of amphoteric electrolytes include amino acids, such as glycine. In an embodiment, the electrolyte solution comprises an electrolyte that a benzotriazole compound. In an embodiment, the electrolyte solution comprises 5-Methyl-1H-benzotriazole ("MBTA"), which has the chemical structure:

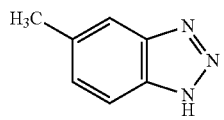

MBTA can lose a proton to act as a weak acid or accept a proton using the lone pair electrons located on its nitrogen atoms as a very weak Bronsted base.

In an embodiment, the electrolyte solution comprises an electrolyte that selected from soluble polyelectrolytes, which are polymers that contain charged functional groups. For purposes of the present disclosure, an electrolyte is considered to be soluble if the indicated electrolyte when mixed desired solvent/cosolvent solution at 20° C. (68° F.) in the indicated weight ratio has no visible insoluble components. In an embodiment, the polyelectrolyte is an anionic polyelectrolyte selected from homopolymers of acrylic acid polymers, copolymers of acrylic acid with acrylamide, poly styrene sulfonic acids and 2-acrylamido2-methyl propane sulfonic acids. In an embodiment, the polyelectrolyte is a cationic polyelectrolyte selected from homopolymers of acrylamide, copolymers of acrylamide with quaternised or salified aminoalkyl methacrylates. In an embodiment, the aminoalkyl methacrylates is quaternised by a quaternisation reactant selected from the group consisting of dimethyl sulfate and methyl chloride. In an embodiment, the aminoalkyl methacrylates is salified by hydrochloric acid.

In an embodiment, the electrolyte is present in an amount of from about 0.1 to 10 wt %. In an embodiment, the electrolyte is present in an amount of from about 0.1 to 5 wt %.

In an embodiment, the electrolyte solution comprises water. In an embodiment, the water is present in an amount of from about 1 to 50 wt %.

In an embodiment, the electrolyte solution comprises a non-aqueous cosolvent to assist in solvating the electrolyte. In an embodiment, the cosolvent is selected from alcohol, ester and ether solvents. In an embodiment, the cosolvent is a C1-C6 alkyl alcohol. In an embodiment, the cosolvent is an alcohol selected from methanol, ethanol and isopropyl alcohol. In an embodiment, the cosolvent is selected from C1-C6 mono- or di-alkyl ethers of ethylene glycol or propylene glycol. In an embodiment, the cosolvent is selected from C1-C6 alkyl acetates. In an embodiment, the cosolvent is selected from any of the glycol ether products available from Dow Company under the tradename DOWANOL™", such as DOWANOL™ DPM Glycol Ether, DOWANOL™ DPMA Glycol Ether, DOWANOL™ DPnB Glycol Ether, DOWANOL™ DPnP Glycol Ether, DOWANOL™ EPh Glycol Ether, DOWANOL™ PGDA Glycol Ether, DOWANOL™ PMA Glycol Ether, DOWANOL™ PM Glycol Ether, DOWANOL™ PnB Glycol Ether, DOWANOL™ PnP Glycol Ether, DOWANOL™ PPh Glycol Ether, DOWANOL™ TPM Glycol Ether, and DOWANOL™ TPnB Glycol Ether.

In an embodiment, the cosolvent is a polyol monomer or oligomer. In an embodiment, the cosolvent is a C1-C12 alkyl compound comprising from 2 to 8 hydroxy functionalities. In an embodiment, the cosolvent is selected from 1,3-propanediol; 1,3-butanediol; 1,4-butanediol; 1,2-hexanediol; 1,6-hexanediol; neopentyl glycol; trimethylolpropane; and pentaerythritol. In an embodiment, the cosolvent is non-flammable.

In an embodiment, the cosolvent is present in an amount of from about 50 to 97 wt %.

In an embodiment, the electrolyte solution has a pH of from about 5 to about 9. In an embodiment, the electrolyte solution has a pH of from about 5 to about 7. In an embodiment, the electrolyte solution has a pH of from about 6 to about 6.9. In an embodiment, the electrolyte solution has a pH of from about 6.5 to about 6.7.

In an embodiment, the electrolyte solution is prepared by mixing the electrolyte with the co-solvent and water in any order. In an embodiment, the electrolyte solution is prepared by mixing the electrolyte with the co-solvent and then adding this mixture to water.

The at least one +ve electrode and at least one −ve electrode may be made of any noble material capable of receiving a charge. In an embodiment, the at least one +ve electrode and at least one −ve electrode is made of a material that does not generate or release particles under conditions of use. In an embodiment, the +ve electrode and the −ve electrode are made from the same material. In an embodiment, the +ve electrode is made from a material that is different from that of the −ve electrode. In an embodiment, at least one of the +ve electrode and the −ve electrode is made from a material selected from a metal. In an embodiment, at least one of the +ve electrode and the −ve electrode is made from a metal selected from ruthenium, rhodium, palladium, silver, osmium, iridium, platinum, gold, mercury, rhenium, copper, and alloys and mixtures thereof. In an embodiment, at least one of the +ve electrode and the −ve electrode is made from steel.

The at least one +ve electrode and at least one −ve electrode may be configured of any suitable shape to facilitate particle removal. In an embodiment, the electrodes are configured in a flat shape and arrayed in a parallel fashion to provide a uniform distance between the opposing faces of the electrodes. In an embodiment, the electrodes comprise opposing faces having x and y dimensions that are at least as large as the corresponding dimensions of the electronic component to be treated.

In the present process, a voltage is applied across the +ve electrode and −ve electrodes in an amount sufficient to remove charged particles from the surface of the electronic component. In an embodiment, a potential of from about 0.1 to about 30 volts is applied across the +ve electrode and −ve electrodes. In an embodiment, the applied potential is from about 0.1 to about 11 volts. In an embodiment, the applied potential is from about 0.1 to about 10 volts. In an embodiment, the applied potential is from about 0.1 to about 5 volts. In an embodiment, the applied potential is from about 0.1 to about 1.3 volts. In an embodiment, the applied potential is constant during the time of treatment. In an embodiment, the applied potential varies and the current is constant during the time of treatment. In an embodiment, the applied current during the time of treatment is from about 1 µA to about 50 µA. In an embodiment, the potential is applied for a time of from about 0.5 to about 5 minutes. In an embodiment, the potential is applied for a time of from about 0.5 to about 3 minutes.

Figure 2:
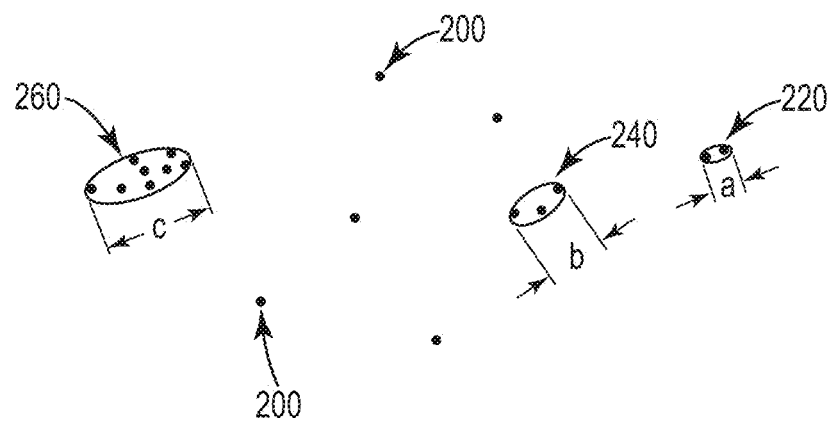
FIG. 2 is a schematic plan view of an FESEM (Field emission scanning electron microscope) micrograph showing particles on a surface.
Figure 3:
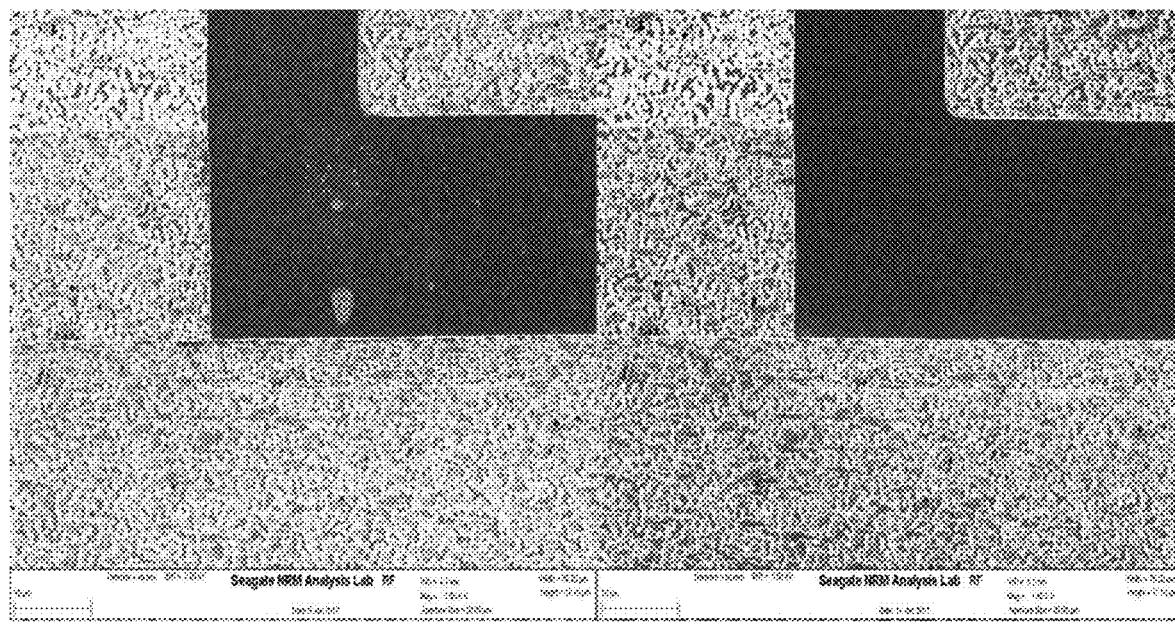
FIG. 3 is a side-by-side comparison of FESEM micrographs of an electronic component before and after having particles removed by the method as described herein.
Figure 4:
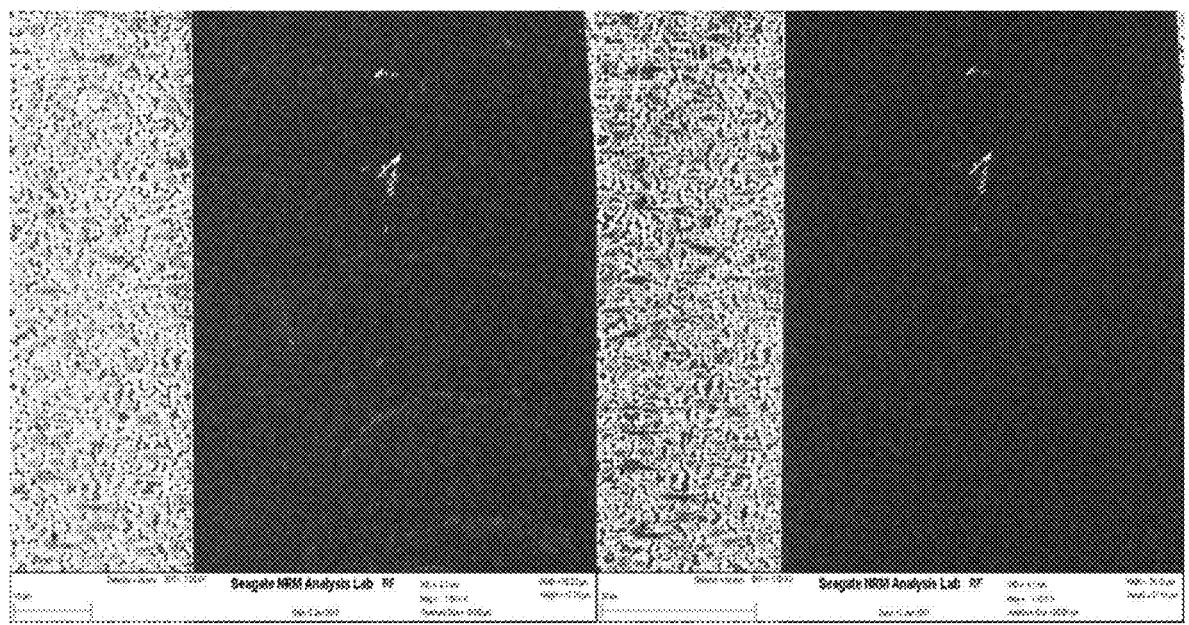
FIG. 4 is a side-by-side comparison of FESEM micrographs of an electronic component before and after having particles removed by the method as described herein.
Figure 5:
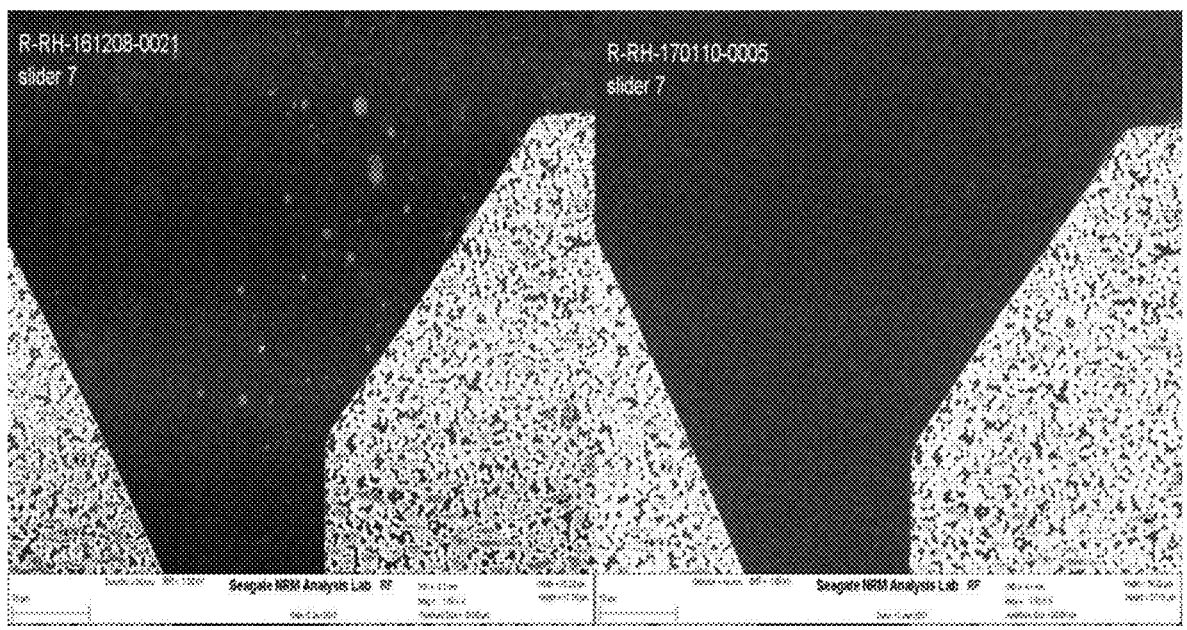
FIG. 5 is a side-by-side comparison of FESEM micrographs of an electronic component before and after having particles removed by the method as described herein.
Figure 6:
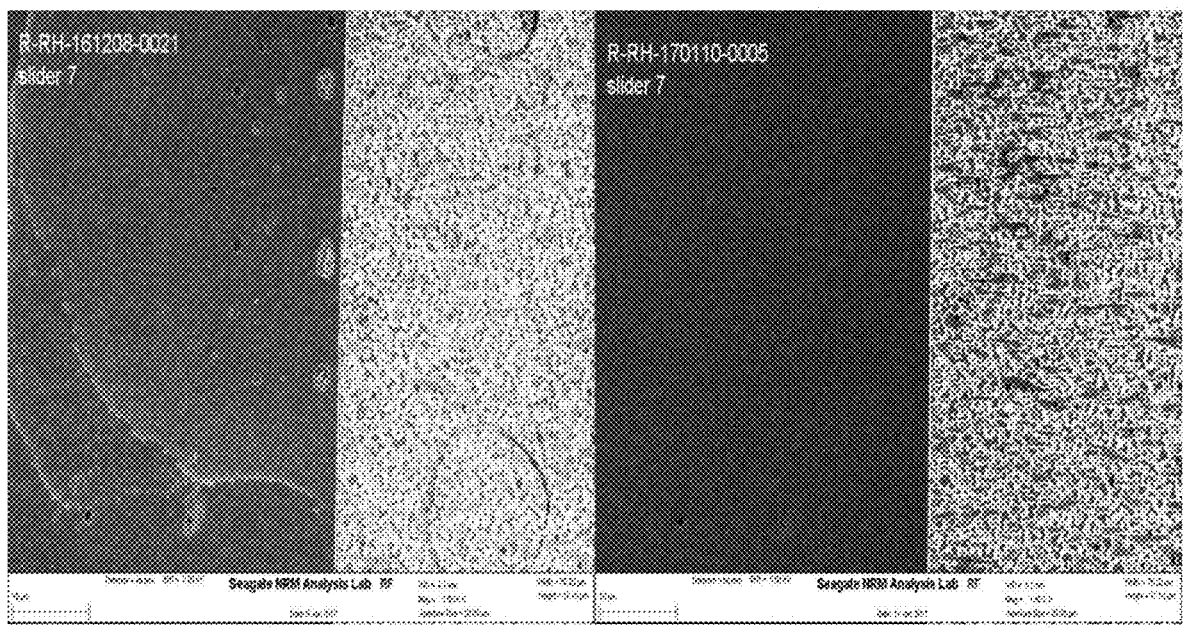
FIG. 6 is a side-by-side comparison of FESEM micrographs of an electronic component before and after having particles removed by the method as described herein.
Figure 7:
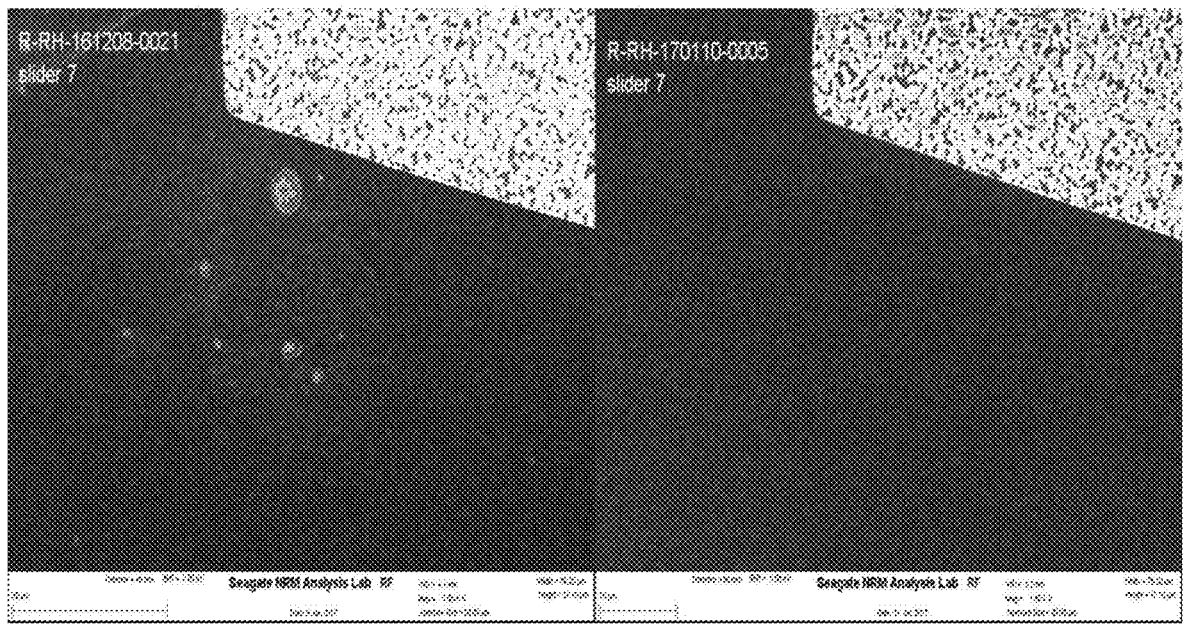
FIG. 7 is a side-by-side comparison of FESEM micrographs of an electronic component before and after having particles removed by the method as described herein.
Figure 8:
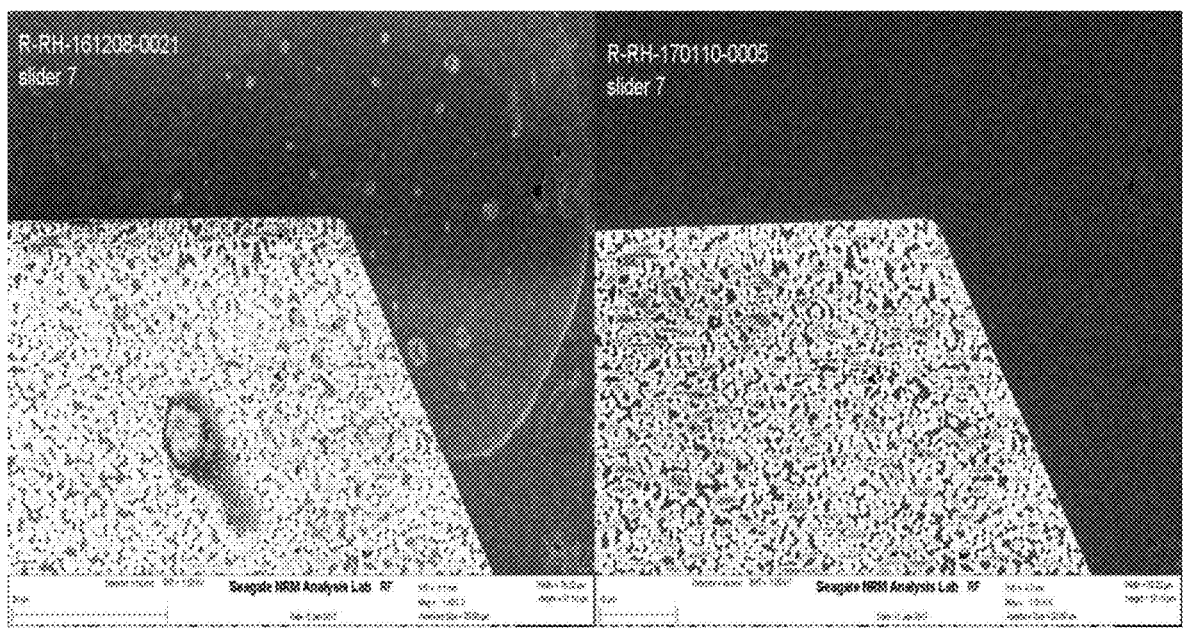
FIG. 8 is a side-by-side comparison of FESEM micrographs of an electronic component before and after having particles removed by the method as described herein.
Figure 9:
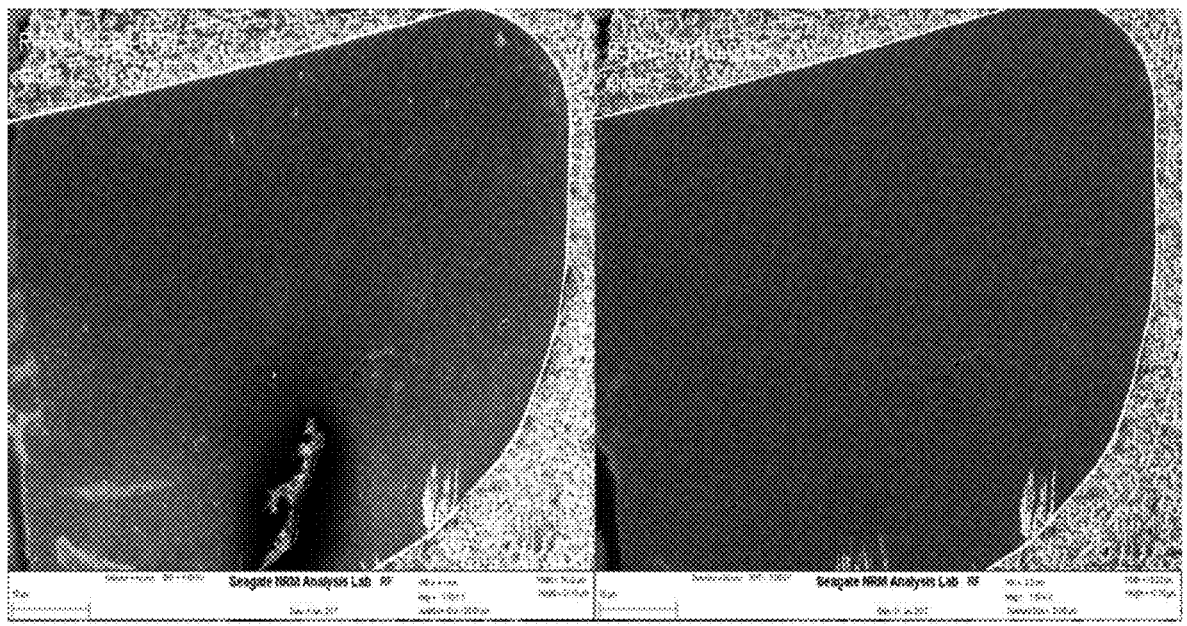
FIG. 9 is a side-by-side comparison of FESEM micrographs of an electronic component before and after having particles removed by the method as described herein.
Figure 10:
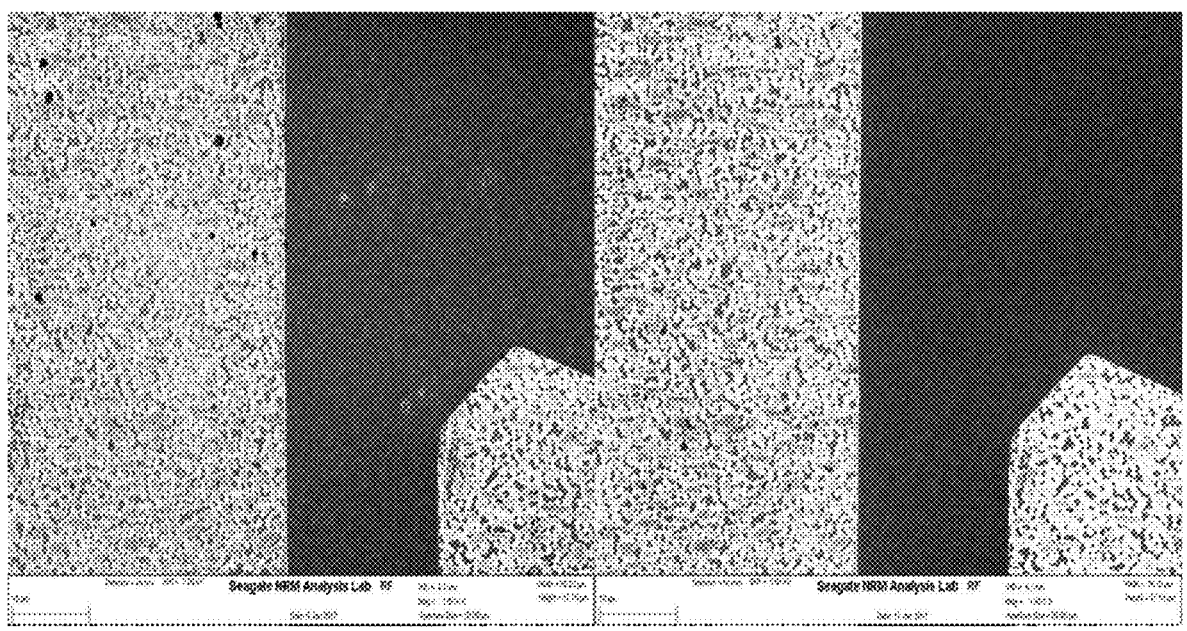
FIG. 10 is a side-by-side comparison of FESEM micrographs of an electronic component before and after having particles removed by the method as described herein.
Figure 11:
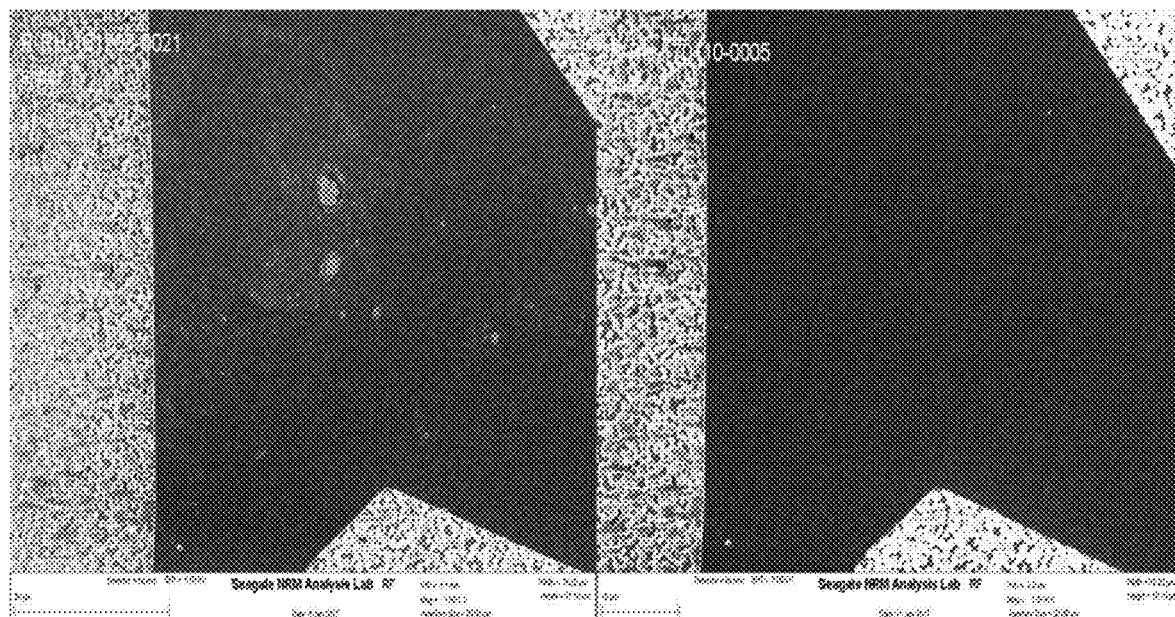
FIG. 11 is a side-by-side comparison of FESEM micrographs of an electronic component before and after having particles removed by the method as described herein.
Figure 12:
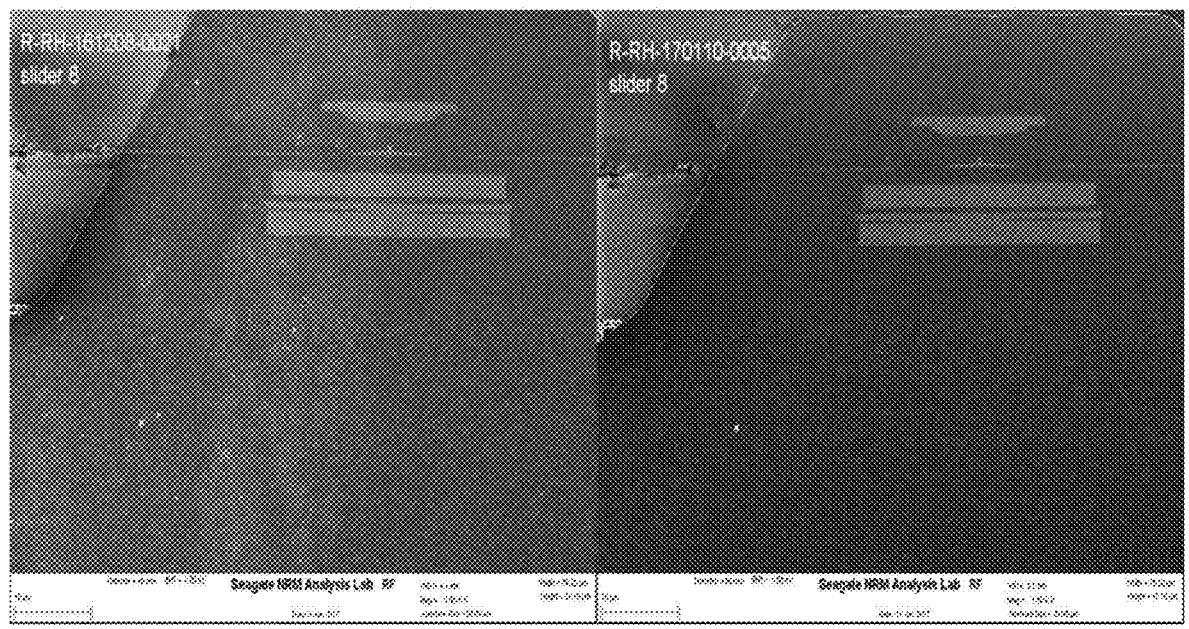
FIG. 12 is a side-by-side comparison of FESEM micrographs of an electronic component before and after having particles removed by the method as described herein.
Figure 13:
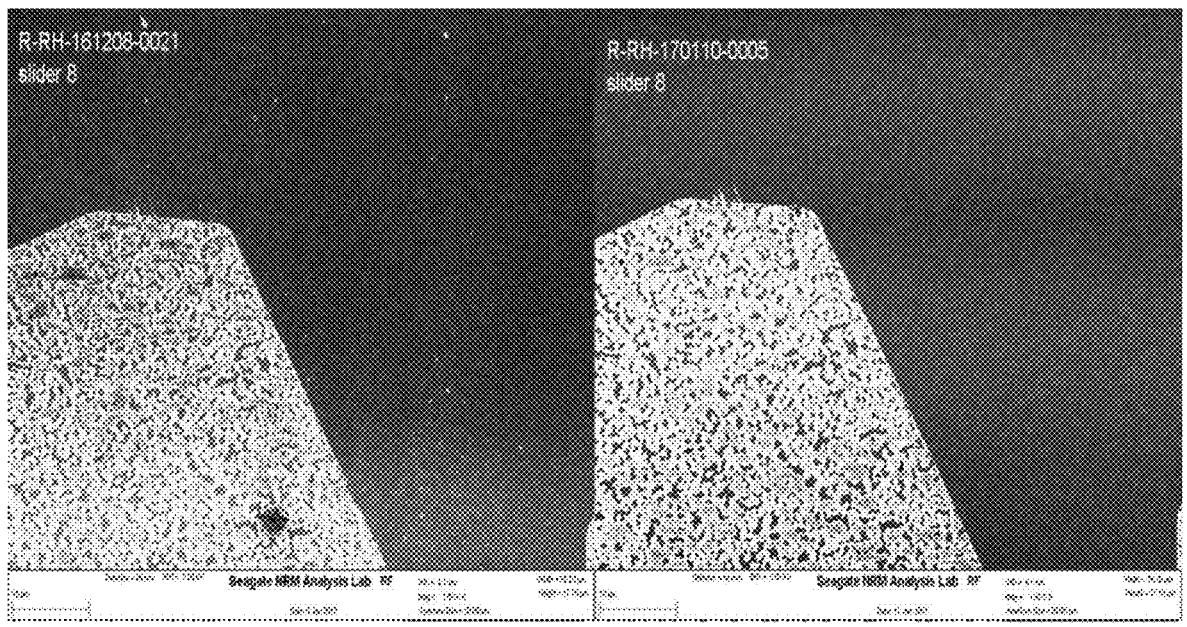
FIG. 13 is a side-by-side comparison of FESEM micrographs of an electronic component before and after having particles removed by the method as described herein.
Figure 14:
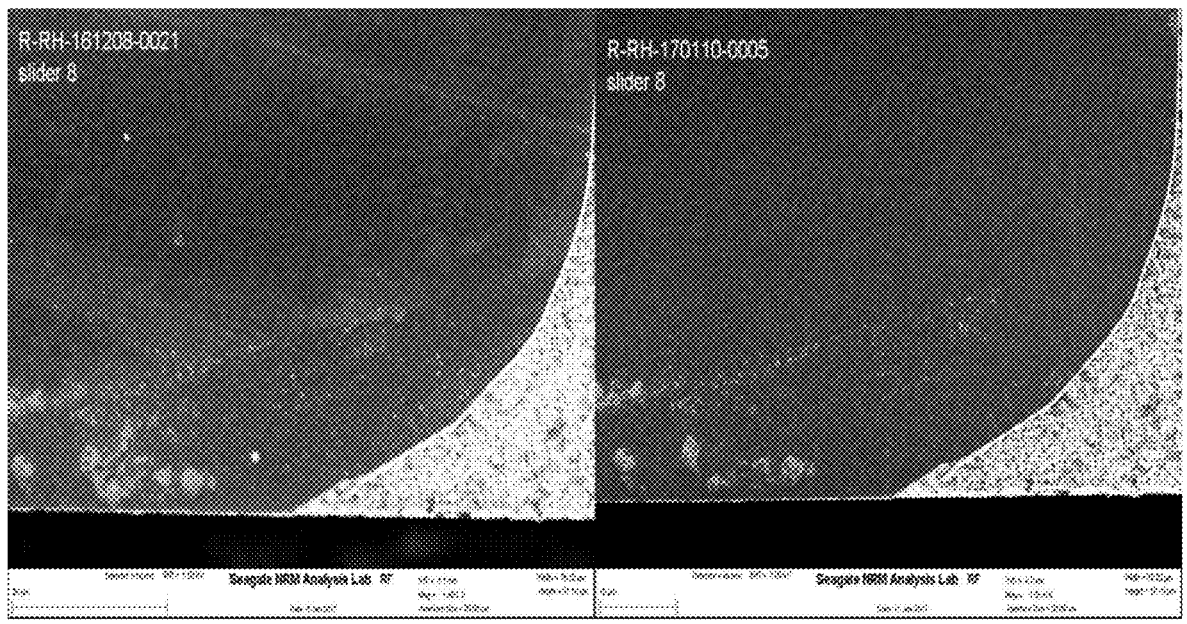
FIG. 14 is a side-by-side comparison of FESEM micrographs of an electronic component before and after having particles removed by the method as described herein.
Figure 15:
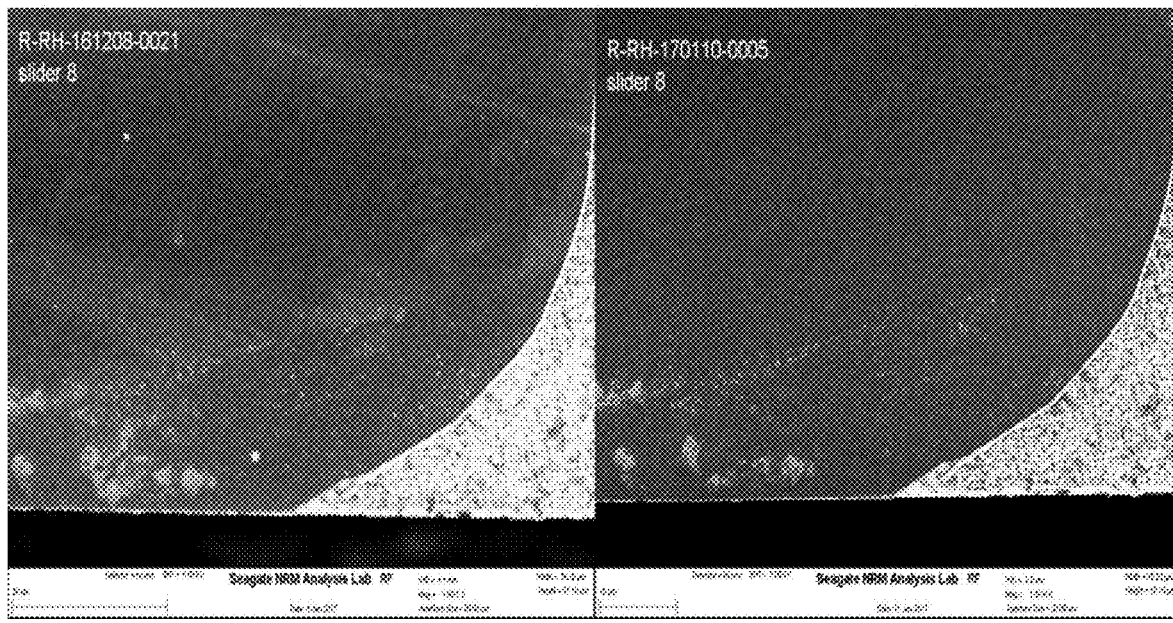
FIG. 15 is a side-by-side comparison of FESEM micrographs of an electronic component before and after having particles removed by the method as described herein.
Figure 16:
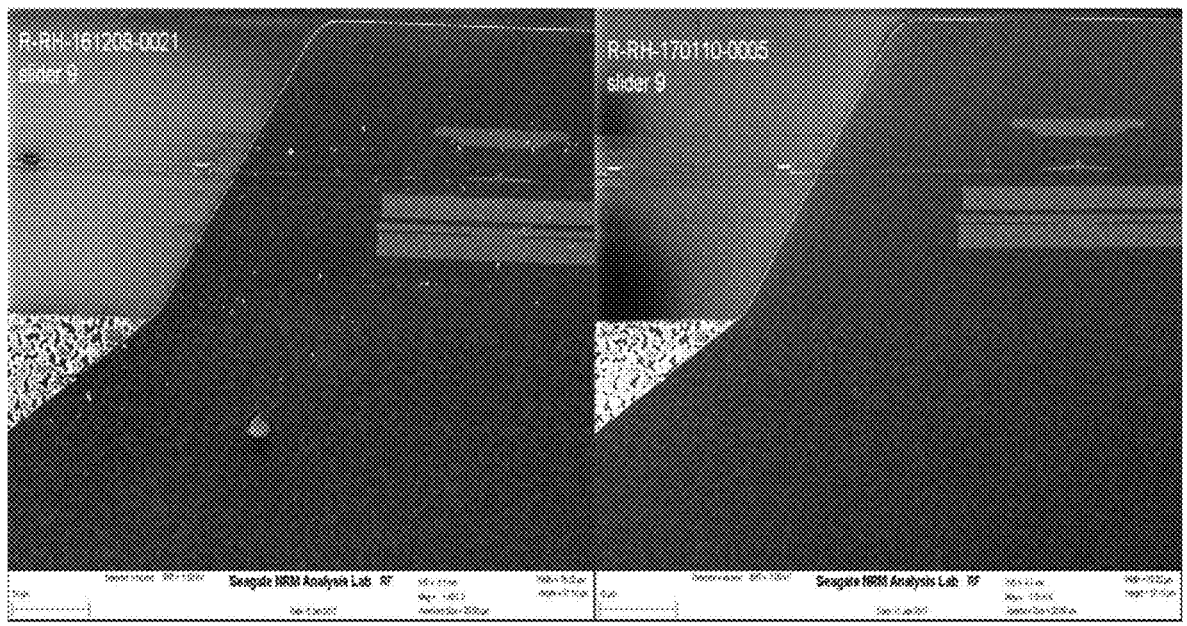
FIG. 16 is a side-by-side comparison of FESEM micrographs of an electronic component before and after having particles removed by the method as described herein.
Figure 17:
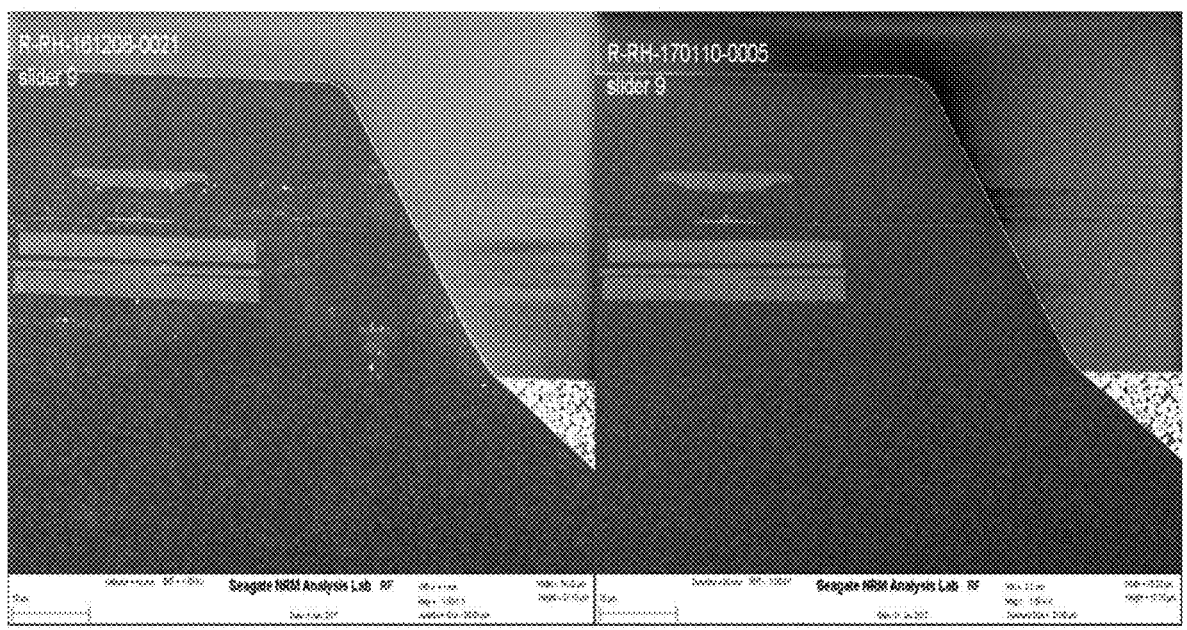
FIG. 17 is a side-by-side comparison of FESEM micrographs of an electronic component before and after having particles removed by the method as described herein.

For purposes of the present disclosure, particles are measured by a Field Emission Scanning Electron Microscope ("FESEM") to identify any particles visible at 2.5 kX magnification within a 2.5 kX magnification field of view (i.e. "sample fields). The degree of particle contamination is measured by identifying "patches" of particles. Particles are defined as being grouped in a patch when a plurality of particles are within 1 um from each other. Any particles that are spaced more than 1 µm apart from any particles in the group will not be counted as a part of the patch. The size of a patch is defined as the longest dimension of the area of associated particles. FIG. 2 is a plan representation of particle distribution to illustrate particle contamination measurement. Particles as represented by dots are present on the surface. A plurality of particles 200 are distributed more than 1 um from each other. A first patch 220 is defined by having two particles within 1 um from each other. The patch size of first patch 220 is defined as the distance from the first particle to the second within first patch 220, identified as distance a. A second patch 240 is defined by having three particles distributed so that all three particles are within 1 um from at least one of the three particles in the particle grouping. The patch size of second patch 240 is defined as the distance between the two particles that are farthest apart from each other, identified as distance b. A third patch 260 is defined by having a plurality of particles distributed so that all particles are within 1 um from at least one of the particles in the particle grouping. The patch size of third patch 260 is defined as the distance between the two particles that are farthest apart from each other, identified as distance c.

In an embodiment, the electronic component after particle removal has a particle distribution such that no patches are formed that are greater than 10 µm in the longest dimension of the set of qualifying particles.

In an embodiment, the electronic component after particle removal has a particle distribution such that no patches are formed that are greater than 10 µm in the longest dimension of the set of qualifying particles, and no more than one patch is formed that is greater than 5 µm in the longest dimension of the set of qualifying particles.

In an embodiment, the electronic component after particle removal has a particle distribution such that no patches are formed that are greater than 5 µm in the longest dimension of the set of qualifying particles.

In an embodiment, the electronic component after particle removal has a particle distribution such that no patches are formed that are greater than 5 µm in the longest dimension of the set of qualifying particles, and no more than one patch is formed that is greater than 3 µm in the longest dimension of the set of qualifying particles.

In an embodiment, the electronic component after particle removal has a particle distribution such that no patches are formed that are greater than 3 µm in the longest dimension of the set of qualifying particles.

In an embodiment, the electronic component after particle removal has a particle distribution such that no patches are formed.

In an embodiment, the electronic component after particle removal has a particle distribution such that no particles are detected in 19 out of 20 sample fields evaluated. In an embodiment, the electronic component after particle removal has a particle distribution such that no particles are detected in at least 95% of sample fields evaluated. In an embodiment, more than one sample field is evaluated on a single electronic component. In an embodiment, one sample fields is evaluated on each separate electronic component (i.e. 20 components are evaluated for particle contamination in one evaluation).

As noted above, the present method effectively removes particles from electronic components with a reduced or eliminated need to resort to using aggressive cleaning techniques that can be damage delicate components. In an embodiment of the present method, electronic components are prepared for assembly into a final product construction in a process that includes the present method. In an embodiment of the present method, electronic components are prepared for assembly into a final product construction in a process that includes the present method in combination with a particle removal step that incorporates application of sonic energy to the electronic component. In an embodiment of the present method, electronic components are prepared for assembly into a final product construction in a process that includes the present method in combination with a particle removal step, but that does not incorporate application of sonic energy to the electronic component. In an embodiment of the present method, electronic components are prepared for assembly into a final product construction in a process that includes the present method, but that does not include a particle removal step that incorporates application of a physical contact cleaning operation (such as brushing) to the electronic component.

Examples

Sliders were imaged by SEM scan to identify location of talc particles prior to treatment in an electrochemical bath to remove particles.

The sliders were then deposited in an electrolyte bath of dipropylene glycol monomethyl ether (also known as "glycol ether DPM"), comprising 1.3 wt % 5-Methyl-1H-benzotriazole and 10 wt % DI water. The electrodes used were silicon wafers with rhuthenium deposited by vacuum deposition having a surface area of about 10 cm². A 1V voltage potential was applied across the +ve electrode and −ve electrodes at a current level of 0.5 mA for 5 minutes.

An aqueous rinse was carried out after the electrochemical process, wherein the parts previously cleaned by the electrochemical process were placed in a cleaning system for rinsing with DI water and brushed using a ToolTek cleaning system comprising a rotary nylon brush.

The thus treated sliders were imaged by Field emission scanning electron microscopy (FESEM) scan, and compared with the pre-treatment FESEM scans to determine talc removal. Side-by-side scans are presented in FIGS. 3-17, wherein the pre-treatment slider is shown on the left and the post-treatment slider is shown on the right. As can be seen by visual inspection of these scans, significant talc removal is accomplished even when using bench scale equipment.

What is claimed is:

1. A method of rane charged particles from an electronic component, the method comprising the steps of:
    Providing an electrochemical bath comprising a +ve electrode, a −ve electrode and an electrolyte solution;
    Immersing an electronic component in the electrochemical bath; and
    Applying a voltage across the +ve electrode and −ve electrodes in an amount sufficient to remove charged particles from a surface of the electronic component, wherein the charged particles comprise talc.

2. The method of claim 1, wherein the electronic component is a data storage component.

3. The method of claim 1, wherein the electroniconic component is a hard disk drive component.

4. The method of claim 1, wherein the electrolyte solution comprises an amphoteric electrolyte.

5. The method of claim 1, wherein the electrolyte solution comprises a benzotriazole compound.

6. The method of claim 1, wherein the electrolyte solution comprises 5-Methyl-1H-benzotriazole in an amount of from about 0.1 to 10 wt %.

7. The method of claim 1, wherein the electrolyte solution comprises water in an amount of from about 1 to 50 wt %.

8. The method of claim 1, wherein the electrolyte solution comprises water and further comprises a non-aqueous cosolvent in an amount of from about 50 to 97 wt %.

9. The method of claim 1, wherein the electrolyte solution has a pH of from about 5 to about 9.

10. The method of claim 1, wherein the voltage is applied across the +ve electrode and −ve electrodes in an amount of from about 0.1 to about 30 volts.

11. The method of claim 1, wherein the voltage is applied across the +ve electrode and −ve electrodes in an amount of from about 0.1 to about 11 volts.

12. The method of claim 1, wherein the voltage applied across the +ve electrode and −ve electrodes for a time of from about 0.5 to about 5 minutes.

13. The method of claim 1, wherein the surface of the electronic component after particle removal has a particle distribution such that no patches are formed that are greater than 10 μm in the longest dimension of the patch.

14. The method of claim 1, wherein the surface of the electronic component after particle removal has a particle distribution such that no patches are formed that are greater than 3 μm in the longest dimension of the patch.

15. The method of claim 1, wherein the surface of the electronic component after particle removal has a particle distribution such that no patches are formed.

16. A method of preparation of electronic components for assembly into a final product construction, the method comprising the method of claim 1, wherein the method of preparation does not incorporate application of sonic energy to the electronic components.

17. A method of preparation of electronic components for assembly into a final product construction, the method comprising the method of claim 1, wherein the method of preparation does not include a particle removal step that incorporates application of a physical contact cleaning operation to the electronic component.

18. A method of removing charged particles from an electronic component, the method comprising the steps of:
    Providing an electrochemical bath comprising a +ve electrode, a −ve electrode and an electrolyte solution;
    Immersing an electronic component in the electrochemical bath; and
    Applying a voltage across the +ve electrode and −ve electrodes in an amount sufficient to remove charged particles from a surface of the electronic component, wherein the electronic component is a slider assembly.

19. A method of removing charged particles from an electronic component, the method comprising the steps of:
    Providing an electrochemical bath comprising a +ve electrode, a −ve electrode and an electolyte solution;
    Immersing an electronic component in the electrochemical bath; and
    Applying a voltage across the +ve electrode and −ve electronodes in an amount sufficient to remove charged particles from a surface of the electronic component, wherein the electronic component is a slider element.

20. A method of removing charged particles from an electronic component, the method comprising the steps of:
    Providing an electrochemical bath comprising a +ve electrode, a −ve electrode and an electrolyte solution;
    Immersing an electronic component in the electrochemical bath by positioning the electronic component between the +ve electrode and the −ve electrode; and
    Applying a voltage across the +ve electrode and −ve electrodes in an amount sufficient to remove charged particles from a surface of the electronic component;
    wherein the electrolyte solution consists of water, an electrolyte, and an optional non-aqueous consolvent.

* * * * *

UNITED STATES PATENT AND TRADEMARK OFFICE
CERTIFICATE OF CORRECTION

PATENT NO. : 10,731,270 B2  
APPLICATION NO. : 15/686021  
DATED : August 4, 2020  
INVENTOR(S) : Zubair Ahmed Khan Page 1 of 1

It is certified that error appears in the above-identified patent and that said Letters Patent is hereby corrected as shown below:

In the Claims

Column 7, Claim 3, Line 48, "The method of claim 1, wherein the electroniconic" should be -- The method of claim 1, wherein the electronic --

Column 8, Claim 20, Line 62, "electrolyte, and an optional non-aqueous consolvent" should be -- electrolyte, and an optional non-aqueous cosolvent --

Signed and Sealed this  
Thirty-first Day of May, 2022

Katherine Kelly Vidal  
*Director of the United States Patent and Trademark Office*